Jan. 24, 1967　　　T. K. VICKERS　　　3,300,778
PERSPECTIVE OBJECT INDICATOR

Filed Dec. 11, 1963　　　3 Sheets-Sheet 1

United States Patent Office 3,300,778
Patented Jan. 24, 1967

3,300,778
PERSPECTIVE OBJECT INDICATOR
Tirey K. Vickers, Plainfield, Ind., assignor to Hazeltine Research, Inc., a corporation of Illinois
Filed Dec. 11, 1963, Ser. No. 329,664
5 Claims. (Cl. 343—7.9)

The present invention relates to an information processing and display system in which the information to be displayed which is moving with respect to the observer is presented in natural, dynamic relationship.

Each year as air travel increases it becomes more apparent that there is a need for a reliable aircraft oriented collision avoidance system. There are thousands of miles of air space that cannot be adequately covered by ground surveillance and with the ever increasing air traffic, even those areas that are covered by ground surveillance are becoming so congested that it is imperative that greater reliance be placed on each aircraft to avoid dangers in its vicinity. Present methods of instrumentation do not provide the pilot either with sufficient information or an adequate presentation of the information on the aircraft in his vicinity in a multiple aircraft traffic situation to allow him to be his own traffic controller. Even in those cases where all the positional information for each aircraft is available there is the difficulty of presenting this three dimensional situation on a two dimensional display. In a multiple aircraft situation it is too difficult for the pilot to correlate the positional information from several sources for each aircraft.

The perspective object indicator presents the three dimensional position of an object on a two dimensional display. The information is presented to the observer in a manner that approximates the view he would get if he could view the object or objects directly with his eye. Once the concept of this type display is conceived, other uses for it become apparent. For instance, it could be used for an information flight display in aircraft or other craft, or as a rendezvous or docking display for space vehicles or as an airborne or ground based instrument landing system for aircraft or space vehicles. However, the following discussion will be concerned with the perspective object indicator as it would be used as an airborne collision avoidance system.

It is an object of the present invention therefore, to provide a new and improved means for displaying moving object data.

It is a further object of the present invention to provide a new and improved two dimensional display system that stimulates a three dimensional presentation.

It is still a further object of the present invention to provide a new and improved collision avoidance system.

In accordance with the present invention, a display system including a two dimensional information display surface on which the three dimensional position of an object in space is continuously displayed with respect to a known position, the system comprises a grid superimposed on the display surface consisting of a series of equidistant vertical lines which represent a fixed amount of bearing with respect to each other, intersected by a series of equidistant horizontal lines which represent a fixed amount of altitude with respect to each other. The system further comprises means for representing the object on the display surface by an indication comprising a horizontal line and a vertical line having at least one point in common with the horizontal line, means for representing the known position on the display surface by an indication, means for positioning the known position indication on the display surface at the intersection of any of the superimposed horizontal and vertical lines. The system also comprises means for controlling the distance of the vertical line of the object indication on the display surface from the vertical reference line that intersects the known position indication as a function of the bearing of the object with respect to the known position, so that the distance from the vertical reference line is proportional to the bearing of the object with respect to the known position, means for controlling the distance of the horizontal line of the object indication on the display surface from the horizontal reference line that intersects the known position indication as a function of the altitude of the object with respect to the known position so that the distance from the horizontal reference line is proportional to the altitude of the object with respect to the known position and means for controlling the length of the horizontal and vertical lines that comprise the object indication as a function of the range of the object with respect to the known position so that the length of the lines is inversely proportional to the range.

For a better understanding of the present invention together with other and further objects thereof, reference is had to the following description taken in connection with the accompanying drawings, and its scope will be pointed out in the appended claims.

Referring to the drawings.

Figure 1:
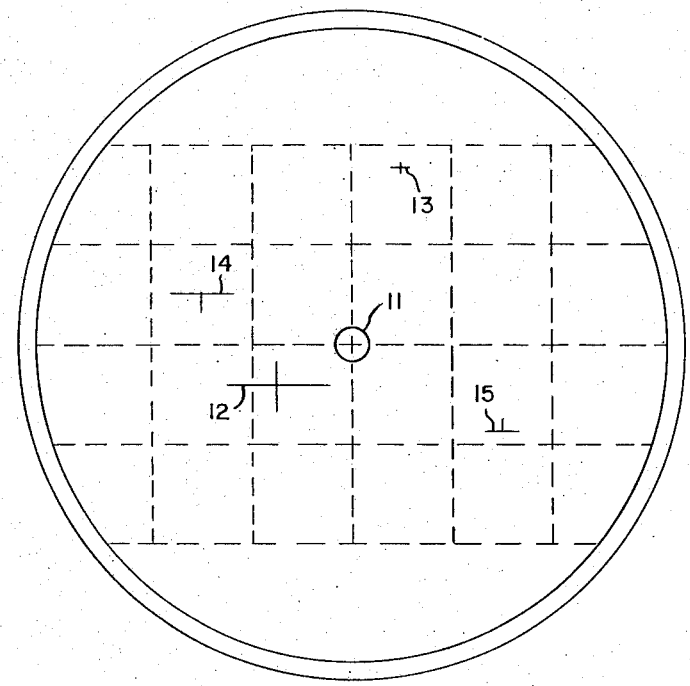
FIG. 1 is a presentation of several object indications as they would appear on the display surface of a display system constructed in accordance with the present invention.

In FIG. 1 is shown a display with several object indications as they might appear on the display surface in the perspective object indicator. The heart of the perspective object indicator is a display such as this and the manner in which the object information is displayed will be explained hereinafter. The display itself might be any display that has a two dimensional display surface. However, for the purpose of this discussion, it is assumed that the display is a cathode-ray tube. On the face of the display or on a separate overlay a dashed grid of equidistant horizontal and vertical lines is etched or painted. The grid lines are very fine with large spacings between the dashes so as not to obscure the object indications.

There are several coordinate systems for locating an object in three dimensions with respect to a known position but the most common is the one that comprises the three spatial coordinates relative bearing, relative altitude and range. In this system, the first spatial coordinate, relative bearing, is the angle between the longitudinal plane that intersects the known position and the vertical plane that intersects the object and the known position; the second spatial coordinate, relative altitude, is the distance between the horizontal plane that intersects the known position and the horizontal plane that intersects the object and the third spatial coordinate, range, is the straight line distance between the object and the known position. In the perspective object indicator, the vertical lines of the grid represent degrees of relative bearing and the horizontal lines of the grid represent feet of relative altitude. The circular symbol 11 shown in FIG. 1 represents the observer or known position. Therefore, the vertical line of the grid that intersects the circular symbol 11 represents zero degrees relative bearing, and the horizontal line of the grid that intersects the circular symbol 11 represents zero feet of relative altitude. Each vertical line, left or right of the zero bearing line represents a fixed number of degrees of bearing left or right, respectively, of the observer. Each horizontal line above and below the zero altitude line represents a fixed number of feet of altitude above and below, respectively, the observer. The amount of bearing and altitude each line represents depends on the use the display is being put to. As an airborne collision avoidance system, each vertical line of the grid might represent 30° of bearing and each horizontal line might represent 500 feet of altitude, and these are the values that will be used in the succeeding discussion. The third positional coordinate range is indicated by providing the same clue that the observer would get if he could view the object with his own eye, namely, the closer the object gets the larger the object indication becomes and the greater the distance between the object and the observer, the smaller the object indication becomes. A scale could be provided to correlate the size of the object indication to an absolute range.

The object indications are synthetically generated and therefore may take any shape desired. The indications shown in FIG. 1, consisting of a vertical line and a horizontal line, have been chosen since they can easily be presented on a display and are best suited to display the desired information. The object indication is located on the display as a function of the relative bearing of the object so that the relative bearing of an object is represented by the distance between the vertical line of the object indication and the vertical reference line or zero bearing line of the grid, and as a function of the relative altitude of the object so that the relative altitude of the object is represented by the distance between the horizontal line of the object indication and the horizontal reference line or zero altitude line of the grid. The length of the horizontal and vertical lines that comprise the object indication are controlled as a function of the range of the object. For example, the object that is represented by the objection indication 12 would be at a bearing of 20° to the left of the known position and at an altitude of 200 feet below the known position and close in range. The object that is represented by object indication 13 is at a bearing of 15° to the right of the known position and altitude of 900 feet above known position and relatively distant.

The object indications shown in FIG. 1 could contain information about the object other than its position. For instance, in the collision avoidance system it would be advantageous to know if the object was about to change altitude or heading, especially altitude. Therefore, as shown by object indication 14 an intention by the object to descend, is shown by removing the segment of the vertical line of the object indication above the horizontal line and as shown by object indication 15 an intention by the object to ascend is shown by removing the segment of the vertical line of the object indication below the horizontal line. A similar system could be used to show an intention to change heading.

There could be two methods of displaying the circular symbol 11 that represents the observer or known position. If the observer has an antenna whose center axis is fixed with respect to the observer, the circular symbol 11 would be etched on the display as are the grid lines. However, if the observer had an antenna that was mounted on a movable base so that its center axis could be moved, a circular symbol 11 could be generated electronically in a similar manner to the way in which the object indications are generated. In this way, the position of the circular symbol can be made to correlate with the position of the antenna. If, for instance, the pilot wished to turn to the right or to the left, he would first rotate his antenna to the right or to the left to observe any possible objects in that direction and the own aircraft indication on the display would be offset accordingly. If he wished to ascend or descend, he would first turn his antenna in the direction of his intended movement to observe any possible objects in that direction. Although it would be possible to rotate the antenna any desired amount a more practical application would be to rotate the antenna a fixed amount in the desired direction or in a combination of desired directions.

Figure 2:
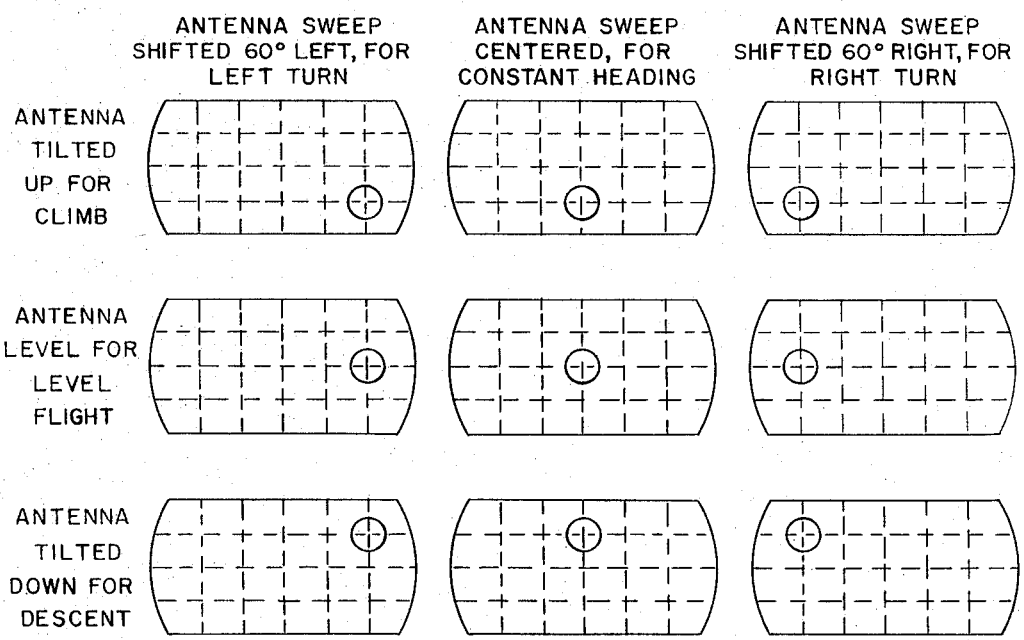
FIG. 2 shows the possible locations of the own position indication in a system which has fixed offsets of the antenna.

FIG. 2 shows all the possible locations of a circular symbol for a system whose field of observation can be varied 60° left and right and 500 feet up or down.

Figure 3:
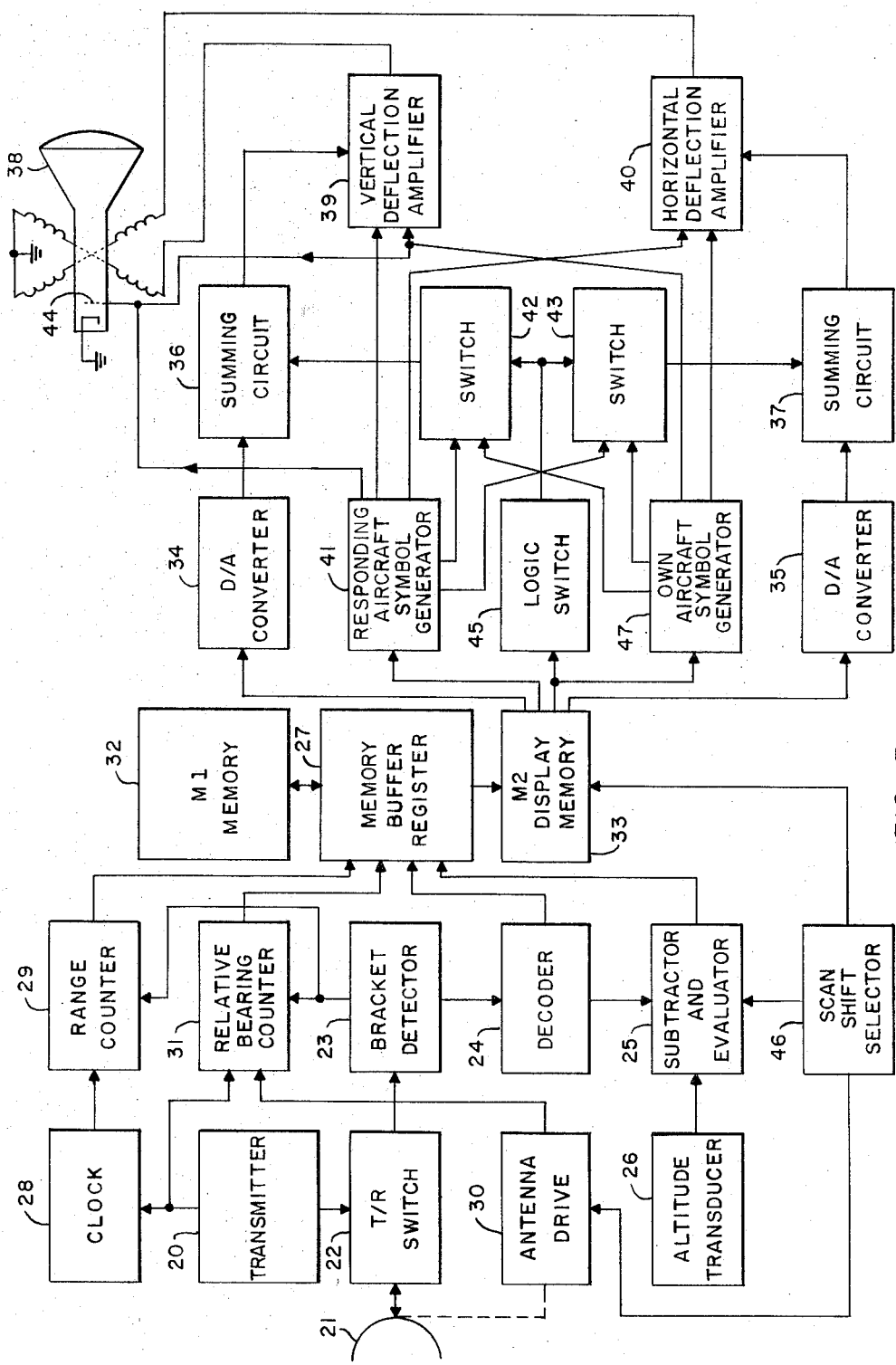
FIG. 3 shows a block diagram of a system constructed in accordance with the present invention.
Figure 4:
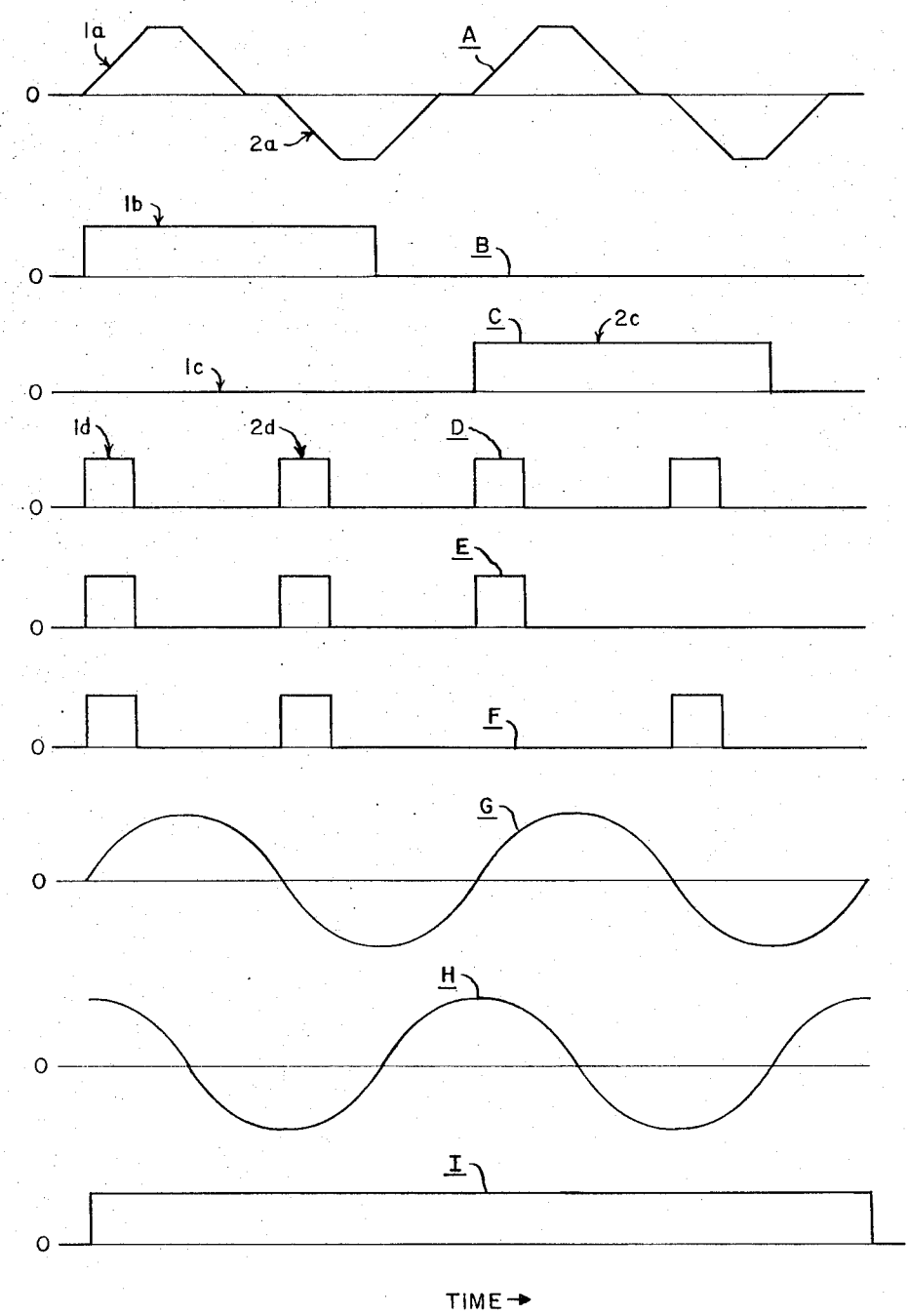
FIG. 4 is a presentation of the waveforms used to generate the object indications on the display of a system constructed in accordance with the present invention.

FIG. 3 is a block diagram of an embodiment of the perspective object indicator. The embodiment shown is for a system whose field of observation can be varied. If the antenna had a fixed field of observation, scan shift selector 46 and the own aircraft symbol generator 47, logic switch 45, the switches 42 and 43 and all associated leads would be removed and the circular symbol would be etched on the display as previously stated. This embodiment is described in conjunction with the waveforms shown in FIG. 4.

A coded interrogation signal is generated by the transmitter 20. The signal might take the form of two pulses at a frequency $f_1$ separated by a predetermined time. The pulse repetition rate of this interrogating signal is determined by the range of the system which is dependent on the sensitivity and range of the antenna 21. Since the amplitude of the responding signal and sensitivity of the antenna 21 is known, the range of antenna 21 can be determined. If the system were determined to have for example a range of twenty-five nautical miles, the interrogating pulses must be spaced so that each interrogation can go out twenty-five miles and return before the next interrogation is generated. Since it takes approximately 12.4 microseconds per nautical round trip mile, for a practical value a rate of 2,000 interrogations per second might be chosen since it will allow for a spacing of 500 microseconds between pulses, which is equivalent to approximately forty nautical miles. For a system with a greater range the interrogation rate must be lowered or the object responses would become intermingled and garbled.

The output of the transmitter is coupled to T/R switch 22. When an interrogation is to be sent out the T/R switch 22 is in the transmit mode and the output of T/R switch 22 is coupled to antenna 21. The antenna 21 rotates in a horizontal plane about the longitudinal axis of the aircraft in a semicircular pattern at thirty times per minute. The propagation pattern is a narrow beam of approximately 4° in which the interrogation signal is radiated at the rate of 2,000 times per second. When an interrogating pulse strikes another aircraft it triggers an altimeter coded transponder in that aircraft. Such transponders are well known in the art. The response from the responding aircraft is a multiple pulse response at a frequency of $f_2$ which contains the altitude of the responding aircraft and any intention to change altitude in coded form. The code could be any digital code but would probably be the MOA-Gillham code (Ministry of Aviation) also known as the ICAO (International Civil Aviation Organization) code which is becoming standard in altitude coding.

The coded response is received by antenna 21 and coupled to T/R switch 22. Now the T/R switch is in the receive mode so that the response is coupled to the bracket detector 23. The purpose of the bracket detector 23 is to determine if this received signal is truly a response to an interrogation. A true response must have a certain fixed time relationship between the first and last pulses of the message. These pulses are known as the bracket pulses and contain no information other than "this is a true response." If the bracket detector 23 determines that this is a true response, the coded altitude information is coupled to the decoder 24 where the coded altitude and intention information is converted to a binary code.

The altitude information is coupled from the decoder to binary subtractor and evaluator 25 where the altitude from own aircraft altitude transducer 26 is subtracted from the responding aircraft altitude. This relative altitude is then compared with a preset value of for instance plus or minus 1000 feet to determine if this object constitutes a hazard. If it is so determined, the output of the subtractor and evaluator 25 which is the relative altitude of the object is coupled to memory buffer register 27. The intention information is also coupled to the memory buffer register 27 from the decoder 24.

When an interrogating pulse is transmitted, a start pulse is coupled to the clock 28 from the transmitter 20. The output of the clock which is a series of pulses is coupled to the range counter 29 which records the number of pulses developed by the clock 28. The time spacing of these clock pulses is determined by the desired accuracy of the system. Assuming it was decided that the smallest range increment would be one-quarter mile, the clock pulses would be 3.1 microseconds apart The range counter continues to count until the bracket detector determines a response has been received and couples a stop pulse to the range counter. Since each count in the range counter is equivalent to one-quarter mile in range the object range is available in binary form. This range output is coupled to the memory buffer register 27 and the counter 29 is cleared.

The relative bearing of the responding aircraft is determined by noting the position of the antenna 21 when a response is received. For the condition stated, namely, an antenna scanning back and forth through an arc of 180° at the rate of thirty times a minute and transmitting interrogation 2,000 times per second, the spacing between interrogations would be equivalent to a movement of .09° by the antenna. An output is coupled from the antenna drive 30 to the relative bearing counter 31 which enables the counter 31 when the antenna drive 30 begins each sweep from left to right. The relative bearing counter 31 then records the number of interrogations developed by the transmitter 20. When the antenna 21 reaches the end of its arc and begins the sweep from right to left a second signal is coupled from the antenna drive 30 to the relative bearing counter 31 which causes each succeeding output from the transmitter to subtract one count from the relative bearing counter 31, so that the relative bearing counter 31 is now counting from a maximum to zero. Therefore, a given bearing will have the same count in the counter 31 whether the antenna 21 is scanning from right to left or left to right. When the antenna reaches the end of its sweep from right to left the counter is cleared and a new count begun. The bearing is therefore determined by providing a readout pulse from the bracket detector 23 to the relative bearing counter 31 so that at the same time the range is read out from the range counter 29 the relative bearing is read out from the relative bearing counter 31. However, reading out from the relative bearing counter 31 does not clear the counter 31.

The range and relative bearing information is coupled to the memory buffer register 27 along with the relative altitude and intention information. This information is then loaded into the M1 memory 32 by the memory buffer register 27. M1 memory 32 is divided into two sections, M1A and M1B. With each aircraft responding there will be several replies for each sweep of the antenna 21. These replies are loaded into the M1A memory 32 and addressed there according to range. When it is determined that there are no further replies from a particular object during a given antenna sweep the information is transferred from the M1A memory to the M1B memory. In so transferring the information from M1A to M1B the information from several adjacent range addresses are transferred together since the information for a single object may very well overflow from one address to another. The last range address to have information loaded into it is taken as the true range.

Also in transferring the information from M1A to M1B the true relative bearing of the object is determined. Since the beam sweeps across the responding aircraft each reply might have a different bearing. The true bearing is determined by subtracting from the last relative bearing recorded the consecutive nonreplies before the information is transferred plus half the total number of replies.

The information for each object is stored in the M1B memory 32 in sequential order until the end of the antenna sweep. At this time the information contained in the M2 display memory 33 is erased and new information is loaded into the M2 display memory 33 from the M1B memory 32 via the memory buffer register 27. Again the information is loaded into the M2 display memory 33 in random sequential order. The information for each object is coupled out of the display memory sequentially at the rate of thirty times per second. The binary coded altitude and relative bearing information is coupled to digital-to-analog converters 34 and 35, respectively, where it is converted to D.-C. levels. The outputs of digital/analog converters 34 and 35 are coupled to summing circuits 36 and 37, respectively. The output of the summing circuit 36 is coupled to the vertical deflection system of the cathode-ray tube 38 via vertical deflection amplifier 39 thereby positioning the beam with respect to the vertical axis as a function of the relative altitude of the responding aircraft. The output of the summing circuit 37 is coupled to the horizontal deflection system of the cathode-ray tube 38 via horizontal deflection amplifier 40 thereby positioning the beam with respect to the horizontal axis as a function of the relative bearing of the responding aircraft.

Figure 5:
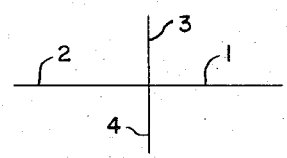
FIG. 5 is a presentation of the manner in which an object indication is generated on a display of a system constructed in accordance with the present invention.

The binary coded range and intention information is coupled to the responding aircraft symbol generator 41. The responding aircraft symbol generator 41 provides the deflection and enabling signals to display the object indication at the position determined by the relative altitude and relative bearing information. As shown by FIG. 5, the object indication is actually composed of four segments. Each segment is produced when there is a coincidence of three required signals provided by the symbol generator. To produce segment 1, segment 1a of waveform A is coupled to the horizontal and vertical deflection amplifiers 39 and 40 via the switches 42 and 43 and the summing circuits 36 and 37. Since there is only an enabling pulse provided to the horizontal deflection amplifier 40 as shown by segments 1b and 1c of waveforms B and C, the deflection voltage is coupled only to the horizontal deflection system of tube 38 thereby causing movement of the beam from left to right. The beam is turned on by the unblanking pulse 1d of waveform D being applied to the grid 44 of the tube 38 during the movement of the beam. The width of this unblanking pulse is determined by the binary coded range information and in turn determines the length of segment 1. At the end of segment 1a the deflection voltage returns to zero and begins a negative-going sweep as shown by segment 2a of waveform A. Since again the enabling pulse 1b and 1c is provided only to the horizontal deflection amplifier, the deflection voltage is coupled only to the horizontal deflection system of tube 38 thereby causing movement of the beam from right to left. Segment 2 is thus produced on the display by the unblanking pulse 2d of waveform D being applied to the grid 44 of the tube 38. Vertical segments 3 and 4 of the object indication are produced in a similar manner when the enabling pulse is coupled to the vertical deflection amplifier 39 as shown by segment 2c of waveform C. Waveforms E and F show the required waveforms for producing object indications that indicate the object intends to ascend or descend, respectively. The waveform chosen depends on the intention information.

After the information for all the responding aircraft to be displayed is coupled out of the M2 display memory 33, the information for the own position indication is coupled from the M2 display memory 33 to the digital-to-analog converters 34 and 35 and logic switch 45. Digital-to-analog converters provide the voltage necessary to position the beam at the desired location, while the logic switch 45 causes switches 42 and 43 to be placed in the own aircraft symbol generator position thereby coupling waveforms G and H to the deflection amplifiers 39 and 40 and waveform I to the deflection amplifiers 39 and 40 as an enabling pulse and to the grid 44 as an unblanking pulse. When the circular symbol has been displayed, responding aircraft indication information is again read from memory. At the end of the antenna sweep the responding aircraft indication information is erased from the M2 display memory 33 and new information placed in this display memory from memory M1B 32.

If it is desired to offset the reference of the antenna 21 the scan shift selector 46 is placed in the desired position. As previously stated, for a practical system it might be possible to offset the center axis of the antenna 21 any combination of 60° left or right and 500 feet up or down. An output is coupled from the scan shift selector 46 to the antenna drive 30 to actually offset the antenna the desired amount. If the antenna is to be displaced in the vertical direction a signal equivalent to an offset of plus or minus 500 feet is coupled to the subtractor and evaluator 25 to offset the position of the responding aircraft indications on the display so that they maintain the proper position with respect to the own aircraft indication. The third output is coupled to the M2 display memory 33 to provide proper offset signals to the own aircraft indication information. These signals are maintained until the scan shift selector 46 is returned to the center position.

While there has been described what is at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A display system including a two dimensional information display surface on which the three dimensional position of an object in space is continuously displayed with respect to a known position, said system comprising:
    a grid superimposed on the display surface consisting of a series of equidistant vertical lines which represent a fixed amount of bearing with respect to each other, intersected by a series of equidistant horizontal lines which represent a fixed amount of altitude with respect to each other;
    means for representing the object on the display surface by an indication comprising a horizontal line and a vertical line having at least one point in common with said horizontal line;
    means for representing the known position on the display surface by an indication;
    means for positioning the known position indication on the display surface at the intersection of any of said superimposed horizontal and vertical lines;
    means for controlling the distance of said vertical line of the object indication on the display surface from the vertical reference line that intersects the known position indication as a function of the bearing of the object with respect to the known position, so that the distance from said vertical reference line is proportional to the bearing of the object with respect to the known position;
    means for controlling the distance of said horizontal line of the object indication on the display surface from the horizontal reference line that intersects the known position indication as a function of the altitude of the object with respect to the known position so that the distance from said horizontal reference line is proportional to the altitude of the object with respect to the known position;
    and means for controlling the length of said horizontal and vertical lines that comprise the object indication as a function of the range of the object with respect to the known position so that the length of said lines is inversely proportional to said range.

2. A display system including a two dimensional information display surface on which the three dimensional position of an object in space is continuously displayed with respect to a known position by three characteristics of the object indication on the display surface, two of said characteristics being the positional coordinates of the object indication on the display surface, said system comprising:
    means for controlling the first positional coordinate of the object indication on the display surface as a function of the first spatial coordinate of the object;
    means for controlling the second positional coordinate of the object indication on the display surface as a function of the second positional coordinate of the object;
    means for controlling the third characteristic of the object indication on the display surface as a function of the third spatial coordinate of the object;
    and means for displaying the intention of the object to change one of its existing conditions that determine the position of the object indication on the display by a fourth characteristics of the object indication.

3. A display system including a two dimensional information display surface on which the three dimensional position of an object in space is continuously displayed with respect to a known position, said system comprising:
    a grid superimposed on the display surface consisting of a series of equidistant vertical lines which represent a fixed amount of bearing with respect to each other intersected by a series of equidistant horizontal lines which represent a fixed amount of altitude with respect to each other;
    means for representing the object on the display surface by an indication comprising a horizontal line and a vertical line having at least one point in common with said horizontal line;
    means for representing the known position on the display surface by an indication;
    means for positioning the known position indication on the display surface at the intersection of any of said superimposed horizontal and vertical lines;
    means for controlling the distance of said vertical line of the object indication on the display surface from the vertical reference line that intersects the known position indication as a function of the bearing of the object with respect to the known position, so that the distance from said vertical reference line is proportional to the bearing of the object with respect to the known position;
    means for controlling the distance of said horizontal line of the object indication on the display surface from the horizontal reference line that intersects the known position indication as a function of the altitude of the object with respect to the known position so that the distance from said horizontal reference line is proportional to the altitude of the object with respect to the known position;
    means for controlling the length of said horizontal and vertical lines that comprise the object indication as a function of the range of the object from the known position so that the length of said lines is inversely proportional to said range;
    and means for displaying the intention of the object to change altitude by the presence or absence of the segments of the vertical line of the target indication, the absence of the segment of said vertical line above or below the horizontal line of the target indication representing the intention of the target to descend or ascend respectively, the presence of both of said segments indicating the intention of the target to remain in level flight.

4. A cooperative collision avoidance system between a multiplicity of aircraft including in each aircraft a transmitter, a receiver, a rotating antenna and a display device said system comprising:

means for transmitting a coded interrogation signal from a first aircraft;

means for receiving an altitude coded response by said first aircraft, decoding said response to determine the altitude of the responding aircraft and comparing said altitude with the altitude of said first aircraft to determine the relative altitude of said second aircraft with respect to said first aircraft;

means for determining the position of the antenna of said first aircraft with respect to a longitudinal reference axis at the time said altitude coded response is received to determine the relative bearing of said second aircraft with respect to said first aircarft;

means for measuring the time elapsed between the transmission of said coded interrogation and the reception of said altitude coded response by said first aircraft to determine the range of said second aircraft;

means for storing said relative altitude, relative bearing and range information for each of said responding aircraft;

means for developing signals required to generate an aircraft indication on a two dimensional display surface as a function of the relative bearing, relative altitude and range information; means for sequentially coupling said relative bearing, relative altitude and range information from said storing means to said means for developing signals so that the relative bearing of the aircraft is represented by the distance of said indication from a vertical reference line, the relative altitude of the aircraft is represented by the distance of said indication from a horizontal reference line and the range of the aircraft is represented by the size of such aircraft indication;

and means for periodically updating said relative altitude, relative bearing and range information contained in said storing means.

5. A cooperative collision avoidance system between a multiplicity of aircraft including in each aircraft a transmitter, a receiver, an antenna rotating in a semi-circular pattern and a display system including a cathode-ray tube on which an observing aircraft is displayed by a circular indication, and observed aircraft are displayed by an indication consisting of a horizontal line and a vertical line having at least one point in common with said horizontal line, said system comprising:

means for transmitting a coded interrogation signal from said observing aircraft;

means for receiving an altitude and intention to change altitude coded response by said observing aircraft, decoding said response to determine the altitude of the responding aircraft and any intention to change altitude and comparing said altitude with the altitude of said observing aircraft to determine the relative altitude of said observed aircraft with respect to said observing aircraft;

means for determining the position of the antenna of said observing aircraft with respect to a longitudinal reference axis at the time said altitude coded response is received to determine the relative bearing of said observed aircraft with respect to said observing aircraft;

means for measuring the time elapsed between the transmission of said coded interrogation and the reception of said coded response by said observing aircraft to determine the range of said observed aircraft;

means for storing said relative altitude, relative bearing and range information for each observed aircraft;

means for sequentially coupling said relative bearing, relative altitude and range information for each observed aircraft from said storing means to a signal generating means, said signal generating means to develop sweep signals, enabling signals and grid signals required to generate on the cathode-ray tube said observing aircraft indication and said observed aircraft indication as a function of said relative bearing, relative altitude, intention to change altitude and range information so that the relative bearing of the observed aircraft is represented by the distance of the vertical line of said observed aircraft indication from a vertical reference line that intersects the observing aircraft indication, the relative altitude of the observed aircraft is represented by the distance of said horizontal line of the observed aircraft indication from a horizontal reference line that intersects the observing aircraft indication, the intention of the observed aircraft to change altitude is represented by the presence or absence of the segments of the vertical line of the target indication and the range of the observed aircraft is represented by the length of the horizontal and vertical line that comprise the observed aircraft indication;

and means for updating the relative bearing, the relative altitude, intention to change altitude and range information contained in said storing means at the end of each semicircular rotation of the antenna.

References Cited by the Examiner

UNITED STATES PATENTS

| | | | |
|---|---|---|---|
| 2,530,060 | 11/1950 | Holdom et al. | 343—11 |
| 2,541,030 | 2/1951 | Busignies | 343—11 |
| 2,592,855 | 4/1952 | Bowen et al. | 343—11 |
| 2,606,318 | 8/1952 | Haworth et al. | 343—11 |
| 2,617,982 | 11/1952 | Holschuh et al. | 343—11 X |
| 2,994,867 | 8/1961 | Pierce. | |
| 3,016,530 | 1/1962 | Skidmore | 343—11 |
| 3,089,139 | 5/1963 | Hovannesian et al. | 343—112 |
| 3,093,822 | 6/1963 | Balding | 343—11 |
| 3,130,401 | 4/1964 | Murphy. | |
| 3,201,787 | 8/1965 | Grewe et al. | 343—11 X |

CHESTER L. JUSTUS, *Primary Examiner.*

LEWIS H. MYERS, *Examiner.*

E. T. CHUNG, P. M. HINDERSTEIN,
    D. C. KAUFMAN, *Assistant Examiners.*